(12) United States Patent
Bing et al.

(10) Patent No.: US 9,663,036 B2
(45) Date of Patent: May 30, 2017

(54) FRAMELESS MIRROR AND ASSOCIATED INSTALLATION METHOD

(71) Applicants: AUDI AG, Ingolstadt (DE); VOLKSWAGEN AG, Wolfsburg (DE)

(72) Inventors: Michael Bing, Eitensheim (DE); Pedro Almeida, Tappenbeck (DE); Jörg Stege, Sassenburg (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/899,427

(22) PCT Filed: May 24, 2014

(86) PCT No.: PCT/EP2014/001412
§ 371 (c)(1),
(2) Date: Dec. 17, 2015

(87) PCT Pub. No.: WO2014/202175
PCT Pub. Date: Dec. 24, 2014

(65) Prior Publication Data
US 2016/0137130 A1    May 19, 2016

(30) Foreign Application Priority Data
Jun. 18, 2013    (DE) .................. 10 2013 010 270

(51) Int. Cl.
*G02B 7/18*    (2006.01)
*B60R 1/06*    (2006.01)
(Continued)

(52) U.S. Cl.
CPC .................. *B60R 1/06* (2013.01); *B60R 1/02* (2013.01); *G02B 7/182* (2013.01); *G02B 7/1815* (2013.01)

(58) Field of Classification Search
CPC ..... C09J 5/00; B60R 1/02; B60R 1/06; B32B 17/10568; B32B 17/10018; G02B 5/08; G02B 7/1815; G02B 7/182
(Continued)

(56) References Cited

U.S. PATENT DOCUMENTS

| 7,255,451 B2* | 8/2007 | McCabe ................. B60R 1/088 359/265 |
| 2008/0049295 A1* | 2/2008 | Tonar ....................... C09K 9/02 359/267 |

(Continued)

FOREIGN PATENT DOCUMENTS

| DE | 2 842 253 A1 | 10/1980 |
| DE | 3 641 363 A1 | 6/1988 |

(Continued)

OTHER PUBLICATIONS

International Search Report issued by the European Patent Office in International Application PCT/EP2014/001412.

*Primary Examiner* — Mohammed Hasan
*Assistant Examiner* — Rahman Abdur
(74) *Attorney, Agent, or Firm* — Henry M. Feiereisen LLC

(57) ABSTRACT

In a method for installing a frameless mirror, a mirror glass is positioned on a carrier plate against a stop formed by a border of the carrier plate and glued on the carrier plate. The border is then separated from the carrier plate via a predetermined breaking point of the border.

15 Claims, 3 Drawing Sheets

(51) Int. Cl.
*B60R 1/02* (2006.01)
*G02B 7/182* (2006.01)

(58) Field of Classification Search
USPC .......................................... 359/871
See application file for complete search history.

(56) References Cited

U.S. PATENT DOCUMENTS

2011/0080667 A1    4/2011   Heger et al.
2012/0038964 A1*   2/2012   De Wind .................. B60R 1/04
                                                                                                359/265

FOREIGN PATENT DOCUMENTS

| DE | 197 20 808 A1 | 7/1998 |
| EP | 1 216 883 A1 | 6/2002 |
| EP | 2 505 433 A1 | 10/2012 |
| WO | WO 2011/044312 A1 | 4/2011 |

\* cited by examiner

FRAMELESS MIRROR AND ASSOCIATED INSTALLATION METHOD

CROSS-REFERENCES TO RELATED APPLICATIONS

This application is the U.S. National Stage of International Application No. PCT/EP2014/001412, filed May 24, 2014, which designated the United States and has been published as International Publication No. WO 2014/202175 and which claims the priority of German Patent Application, Serial No. 10 2013 010 270.7, filed Jun. 18, 2013, pursuant to 35 U.S.C. 119(a)-(d).

BACKGROUND OF THE INVENTION

The invention relates to an installation method for a frameless mirror in which a mirror glass is mounted on a carrier plate.

Such a frameless mirror can be used in particular as outside mirror of a motor vehicle. Conventional mirrors normally have a carrier plate with a molded border, with a mirror glass being secured inwards of the border. As an alternative, the glass is positioned by a complex process that can be difficult to master.

It has already been proposed to use frameless mirrors as outside mirror for motor vehicles, because of their particularly attractive look and their small size in view of the absence of the frame. When a frameless mirror is installed, it is, however, necessary to mount a mirror glass with high precision on a carrier plate so as to maintain the required tolerances.

The exact positioning of the mirror glass on the carrier surface is therefore very cumbersome in practice, because a subsequent correction by shifting the carrier plate is nearly impossible.

The invention is therefore based on the object to provide an installation method for a frameless mirror, by which a mirror glass can be mounted on a carrier plate in a simple and yet precise manner.

SUMMARY OF THE INVENTION

This object is attained by a method of the aforementioned type which includes the following steps: using a carrier plate having a border, positioning and gluing the mirror onto the carrier plate by using the border as a stop, and separating the border, having a predetermined breaking point, from the carrier plate.

The invention is based on the idea that for positioning of the mirror glass on the carrier plate, a temporary border can be used which is removed after adhesive bonding of the mirror glass. A mirror glass can be mounted with precision fit on the carrier plate by the method according to the invention, without the need for additional complex devices. After adhesive bonding, the only temporarily required border can be removed in view of its connection with the carrier plate via a predetermined breaking point.

According to a variant of the method according to the invention, a carrier plate with a circumferential border can be used. Thus, the circumferential border can be used as a stop or contact edge for the outer side of the mirror glass. The carrier plate provided with the border thus has a depression into which the mirror glass can be very simply glued. Since positioning is realized via the border, there is the advantage that established installation processes can be retained.

As an alternative, a carrier plate with a border formed with sections to have several border sections can be used in the installation method according to the invention. In this variant, the border is not continuous, but instead provision is made for a plurality of spaced-apart border sections, e.g. several border sections that oppose each other in pairs. The presence of the predetermined breaking point enables removal of the border, which has the several border sections, after the mirror glass has been secured on the carrier plate.

It is also within the scope of the invention to provide in the installation method a predetermined breaking point which is formed between the carrier plate and the border and has one or more sections of reduced diameter. The function of the predetermined breaking point is hereby such that a section of reduced diameter can be separated or torn off by application of a certain pulling force, so that the border is removed from the carrier plate. After tearing off, the mirror glass is mounted by precision fit on the carrier plate; preferably the mirror glass extends beyond the carrier plate so that the frameless mirror is formed. The edges of the mirror glass can be ground about the circumference.

According to a refinement of the installation method according to the invention, provision may be made for a predetermined breaking point which is arranged between the carrier plate and the border and is formed as a perforation. A perforation involves spaced-apart openings in the form of slots, holes, or other configurations between the carrier plate and the border so that a weak spot is created in this area to assume the function of a predetermined breaking point and to facilitate the separation of the border after the securement of the mirror glass.

A heating element can be arranged in the installation method according to the invention between the carrier plate and the mirror glass.

To facilitate separation of the border after installation, provision may be made in accordance with the invention for use of a carrier plate with a border having a tab that can be grabbed for separating the border. This tab may be arranged on the border-side in the region of the predetermined breaking point and enables easy grabbing, so that the tear-off border can be separated from the carrier plate via the predetermined breaking point.

In addition, the invention relates to a frameless mirror with a mirror glass mounted on a carrier plate.

The frameless mirror according to the invention is characterized in that the carrier plate has a border which is used as a stop during positioning and gluing of the mirror glass on the carrier plate and which has a predetermined breaking point for separating the border from the carrier plate.

Further constructions of the invention are described in the subclaims.

BRIEF DESCRIPTION OF THE DRAWING

Further advantages and details of the invention are described based on exemplary embodiments with reference to the drawings. The drawings are schematic views and show.

DETAILED DESCRIPTION OF PREFERRED EMBODIMENTS

Figure 1:
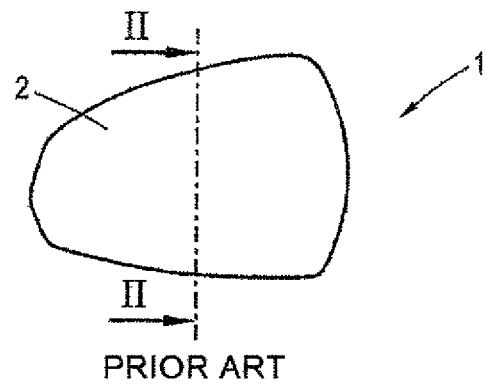
FIG. 1 a conventional frameless mirror.
Figure 2:
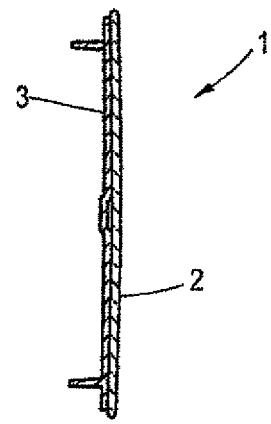
FIG. 2 a sectional side view of the mirror of FIG. 1.

FIG. 1 shows a conventional frameless mirror 1, FIG. 2 is a sectional side view of the mirror 1, which can be used as outside mirror in a motor vehicle. The mirror 1 includes a mirror glass 2, which is mounted on a carrier plate 3. To ensure its proper function, it is necessary to position and glue the mirror glass 2 with high precision on the carrier plate 3.

Figure 3:
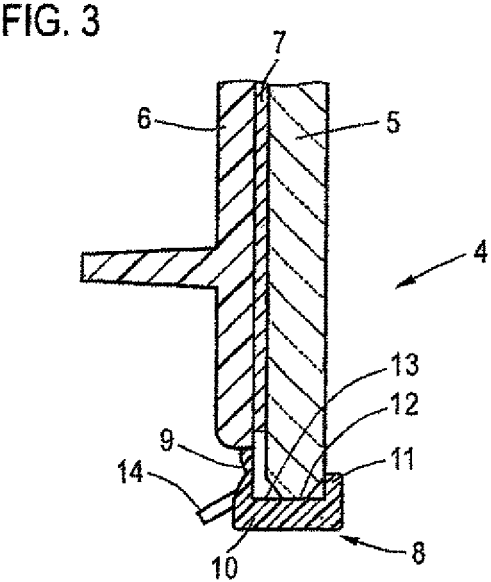
FIG. 3 a sectional side view of a frameless mirror according to the invention.
Figure 4:
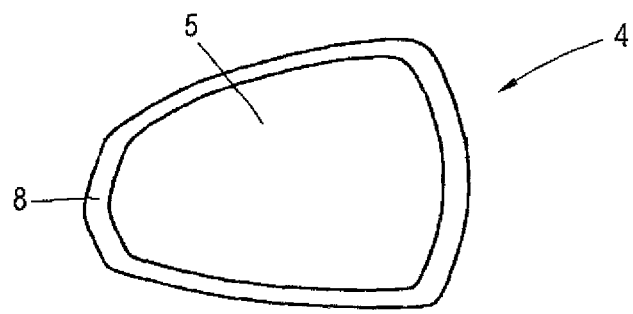
FIG. 4 a further view of the mirror of FIG. 3 during installation.

FIGS. 3 and 4 show a first exemplary embodiment of a frameless mirror, with FIG. 3 being a sectional side view, and FIG. 4 being a view upon the mirror glass during installation.

The frameless mirror 4 includes a mirror glass 5, which is mounted on a carrier plate 6. Arranged between the carrier plate 6 and the mirror glass 5 is a planar electric heating element 7. The heating element 7 is, however, optional; constructions are also possible, in which the mirror glass is placed directly onto the carrier plate 6. When installing the frameless mirror 4, the mirror glass 5 is mounted on the carrier plate 6 by using a carrier plate 6 having a border 8. As is apparent from the sectional view of FIG. 3, the border 8 is formed as a profile which includes a section 9 of reduced diameter which is adjoined by a center portion 10 which extends substantially perpendicular from the section 9 of reduced diameter and perpendicular to the surface of the carrier plate 6. The center section 10 thus surrounds the mirror glass 5 on the outside. Adjoining the center section 10 is an angled end section 11 which is oriented inwards or to the center of the carrier plate 6. The border 8 thus includes the section 9 of reduced diameter, the center section 10, and the end section 11, between which at least substantially right angles are formed, respectively, so that the border 8 overall is configured substantially C-shaped.

As is apparent from FIG. 4, the border 8 is formed to extend all around so as to completely surround the carrier plate 6 during positioning and installation of the mirror glass 5.

When installing the frameless mirror 4, the mirror glass 5 is positioned on the carrier plate 6 by using the border 8 as a stop. The border 8 is made of a plastic material having certain elasticity, so that the mirror glass 5 can be inserted into the circumferential lateral groove formed by the border 8. The mirror glass 5 rests hereby with its outer edges 12 against the inner side 13 of the center portion 10, so that the mirror glass 5 is supported all-round and positioned easily and yet precisely. Although the border 8 has a certain elasticity, it has sufficient rigidity to automatically position the mirror glass 5 with high precision, when inserted in the border 8.

The border 8 has between the section 9 of reduced diameter and the center section 10 a tab 14, where the border 8 can be grabbed to tear off the border 8, after the mirror glass 5 has been glued onto the carrier plate 6. The section 9 of reduced diameter serves hereby as predetermined breaking point; the border 8 can be torn off in the region of reduced diameter through application of a pulling force. The border 8 has a circumferential section 9 of reduced diameter, so that the border 8 can be separated all around.

Figure 5:
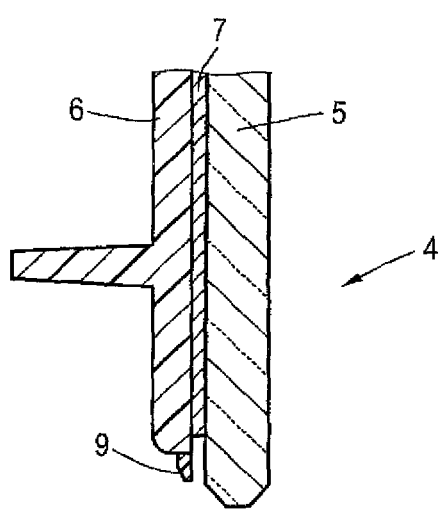
FIG. 5 the mirror according to the invention after separation of the border.

FIG. 5 is a sectional side view and shows the frameless mirror 4 after separation of the border 8. It is apparent from FIG. 5 that only part of the section 9 of reduced diameter remains, whereas the remaining parts of the border 8, that is the center portion 10 and the end portion, have been removed through separation. The mirror glass 5 projects beyond the carrier plate 6 on all sides so as to form the frameless mirror 5.

Figure 6:
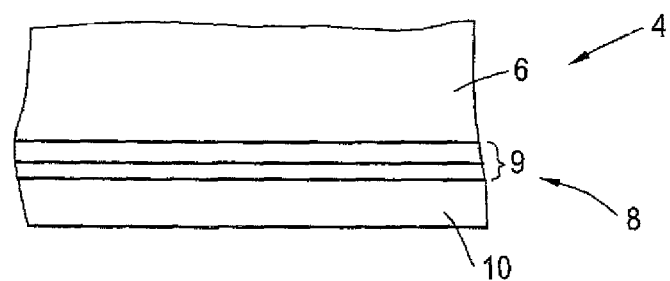
FIG. 6 a detail of the mirror of FIG. 5.

FIG. 6 shows a detail of the frameless mirror 4 prior to tearing off the border. As is apparent from FIG. 6, the section 9 of reduced diameter adjoins the underside of the carrier plate 6. In the region of smallest diameter, an edge is visible. Adjoining the section 9 of reduced diameter is the center section 10 of the border 8.

Figure 7:
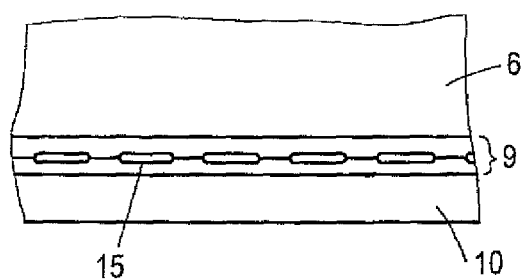
FIG. 7 a detail of a further exemplary embodiment of a mirror according to the invention.

FIG. 7 shows a detail of a further exemplary embodiment of a mirror in which the section 9 of reduced diameter has a perforation with holes 15. This perforation acts as predetermined breaking point, so that the center portion 10 of the border can be easily separated along the perforation.

Figure 8:
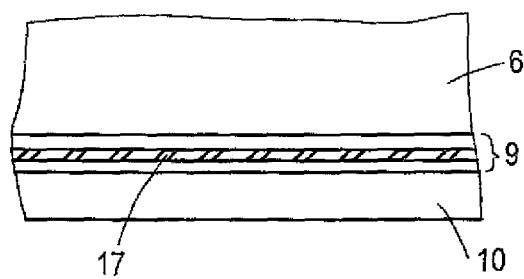
FIG. 8 a detail of a further exemplary embodiment of a mirror according to the invention.

FIG. 8 shows a detail of a further exemplary embodiment of a mirror, in which the section 9 of reduced diameter is provided with webs 17 via which the carrier plate 9 is connected to the center portion 10 of the border. After positioning of the mirror glass, the center portion 10 can be separated by applying a pulling force, thereby tearing off the webs 17 so as to form the frameless mirror.

The invention claimed is:

1. A method for installing a frameless mirror, comprising:
   positioning a mirror glass on a carrier plate against a stop formed by a border of the carrier plate;
   gluing the mirror glass on the carrier plate; and
   separating the border from the carrier plate via a predetermined breaking point of the border, wherein the border has a C-shaped configuration to circumferentially surround the mirror glass, said C-shaped border having a section of reduced diameter which forms the predetermined breaking point.

2. The method of claim 1, further comprising forming the border of the carrier plate as a circumferential border.

3. The method of claim 1, further comprising providing the border of the carrier plate with sections to form several border sections.

4. The method of claim 1, further comprising forming the predetermined breaking point between the carrier plate and the border with one or more sections of reduced diameter.

5. The method of claim 1, further comprising arranging the predetermined breaking point between the carrier plate and the border as a perforation.

6. The method of claim 1, further comprising arranging a heating element between the carrier plate and the mirror glass.

7. The method of claim 1, further comprising forming the border of the carrier plate with a tab which can be grabbed for separating the border.

8. A frameless mirror, comprising:
   a carrier plate having a border formed with a predetermined breaking point; and
   a mirror glass mounted on the carrier plate by positioning the mirror glass on the carrier plate against a stop formed by the border, gluing the mirror glass on the carrier plate, and separating the border from the carrier plate via the predetermined breaking point, wherein the border has a C-shaped configuration to circumferentially surround the mirror glass, said C-shaped border having a section of reduced diameter which forms the predetermined breaking point.

9. The frameless mirror of claim 8, wherein the border of the carrier plate is formed as a circumferential border.

10. The frameless mirror of claim 8, wherein the border of the carrier plate is formed with sections to form several border sections.

11. The frameless mirror of claim 8, wherein the predetermined breaking point has one or more sections of reduced diameter.

12. The frameless mirror of claim 8, further comprising a heating element arranged between the carrier plate and the mirror glass.

13. The frameless mirror of claim 8, wherein the border of the carrier plate has a tab which can be grabbed for separating the border.

14. The frameless mirror of claim 8, wherein the section of reduced diameter is positioned against an underside of the carrier plate.

15. The frameless mirror of claim 8, wherein the section of reduced diameter has a tab which can be grabbed for separating the border.

* * * * *